(12) United States Patent
Dittmer et al.

(10) Patent No.: US 6,843,354 B2
(45) Date of Patent: *Jan. 18, 2005

(54) SELF-ADJUSTING CLUTCH RELEASE BEARING

(75) Inventors: Steffen Dittmer, Herzogenaurach (DE); Ludwig Winkelmann, Erlangen (DE); Bernhard Klöpfer, Bad Windsheim (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/714,306

(22) Filed: Nov. 14, 2003

(65) Prior Publication Data

US 2004/0099502 A1 May 27, 2004

Related U.S. Application Data

(63) Continuation of application No. PCT/EP02/04123, filed on Apr. 13, 2002.

(30) Foreign Application Priority Data

May 18, 2001 (DE) .......................................... 101 24 663

(51) Int. Cl.$^7$ .............................................. F16D 23/14
(52) U.S. Cl. ..................................... 192/98; 192/110 B
(58) Field of Search .............................. 192/98, 110 B; 384/495, 612, 908, 909

(56) References Cited

U.S. PATENT DOCUMENTS 3,741,361 A 6/1973 Brandenstein
4,033,440 A * 7/1977 Ladin ........................... 192/98
4,305,492 A * 12/1981 Mori et al. .................... 192/98
4,565,272 A 1/1986 Miyahara
4,739,867 A * 4/1988 Harrington .................... 192/98
5,116,933 A * 5/1992 Newton ....................... 528/125
6,191,204 B1 * 2/2001 Johnson ....................... 524/439
6,684,996 B2 * 2/2004 Winkelmann et al. ......... 192/98
6,684,997 B2 * 2/2004 Klopfer et al. ............... 192/98
2002/0134641 A1 * 9/2002 Klopfer et al. ............... 192/98

FOREIGN PATENT DOCUMENTS

| DE | 72 45 141 U | 3/1973 |
| DE | 199 12 432 A1 | 9/1999 |
| DE | 199 49 909 A | 4/2001 |
| FR | 2 109 947 A | 5/1972 |
| FR | 2 196 692 A | 3/1974 |
| GB | 474 112 A | 10/1937 |
| GB | 1 030 087 A | 5/1966 |
| GB | 2 339 000 A | 1/2000 |

* cited by examiner

Primary Examiner—Richard M. Lorence
(74) Attorney, Agent, or Firm—Henry M. Feiereisen

(57) ABSTRACT

A self-adjusting release bearing in the form of a tapered rolling bearing for a separating clutch disposed between an internal combustion engine and a gearbox of a motor vehicle, includes a non-rotating first bearing ring, a revolving second bearing ring, and a plurality of rolling elements guided between the first and second bearing rings. Supported upon a calotte-shaped section of one of the first and second bearing rings in a contact zone is an adjustment ring having a complementary calotte-shaped section to thereby allow pivoting of the release bearing, whereby a sliding element made of thermoplastic material is disposed in the contact zone.

20 Claims, 3 Drawing Sheets

SELF-ADJUSTING CLUTCH RELEASE BEARING

CROSS-REFERENCES TO RELATED APPLICATIONS

This application is a continuation of prior filed copending PCT International application no. PCT/EP02/04123, filed Apr. 13, 2002, which designated the United States and on which priority is claimed under 35 U.S.C. §120, the disclosure of which is hereby incorporated by reference.

This application claims the priority of German Patent Application, Serial No. 101 24 663.3, filed May 18, 2001, pursuant to 35 U.S.C. 119(a)–(d), the disclosure of which is incorporated herein by reference.

BACKGROUND OF THE INVENTION

The present invention relates, in general, to a clutch release bearing for a motor vehicle.

A clutch release bearing is typically intended for actuation of a clutch mechanism, e.g. separating clutch, disposed between the internal combustion engine and a gearbox, and is configured as a tapered roller bearing which includes a non-rotatable bearing ring, a revolving bearing ring, and rolling members, received in a cage and guided between the bearing rings. Operatively connected to one of the bearing rings is an adjustment ring, which establishes a connection between a disk spring of the clutch mechanism and the clutch release bearing. The adjustment ring is configured to allow a relative movement of the adjustment ring and the associated one of the bearing rings so as to implement a self-adjustment or self-alignment of the release bearing.

Such a release bearing is able to compensate shocks generated by axial misalignment with the disk spring that is connected directly to the clutch mechanism. The axial misalignment, caused by the disk spring, and axial misalignment as a consequence of manufacturing tolerances between force-transmitting shafts of the internal combustion engine and the gearbox, whereby the clutch release bearing is disposed between the internal combustion engine and the gearbox, increases wear and thus reduces the service life of the release bearing and, moreover, triggers the so-called clutch judder that adversely affects the overall riding comfort.

The clutch release bearing forms part of a release mechanism and is arranged together with a casing on a guide sleeve for axial displacement. The axial movement is implemented by a release lever or a central release member, whereby the disengagement is initiated via a clutch pedal or automatically by a clutch operator. The release bearing is so constructed that the revolving bearing ring as well as the non-rotating bearing ring are supported via an annular skirt on the disk spring, or directly or indirectly on the casing.

German utility model DE 72 45 141 U1 discloses a clutch release bearing which includes an adjustment ring between the disk spring or spring finger ends of the separating clutch and the inner bearing ring of the release bearing. The contact zone between the adjustment ring and the inner bearing ring has a spherical configuration to allow movement and alignment of the mutually supporting components. The adjustment ring and the inner bearing ring are hereby made of same material. As a result, rust formation through friction is experienced that increases wear and generates undesired noise.

It would therefore be desirable and advantageous to provide an improved clutch release bearing to obviate prior art shortcomings and to exhibit a wear-resistant contact zone with little friction between components that move relative to one another, such as adjustment ring and bearing ring.

SUMMARY OF THE INVENTION

According to one aspect of the present invention, a self-adjusting release bearing in the form of a tapered rolling bearing for a separating clutch disposed between an internal combustion engine and a gearbox of a motor vehicle, includes a non-rotating first bearing ring, a revolving second bearing ring, a plurality of rolling elements guided between the first and second bearing rings, an adjustment ring having a calotte-shaped section in a contact zone for support upon a complementary calotte-shaped section of one of the first and second bearing rings to thereby allow pivoting of the release bearing, and a sliding element made of thermoplastic material and disposed in the contact zone.

The present invention resolves prior art problems by providing a sliding element made of a thermoplastic material. This material has a high thermal shock stress and improved crack resistance compared to conventionally used materials. Thermoplastic material is also low in friction and sufficiently wear-resistant as a result of its hardness and strength. Thus, the service life is prolonged and matches the service life of the internal combustion engine.

According to another feature of the present invention, the sliding element may be made of highly heat-resistant polyamides or other highly heat-resistant thermoplastic material such as polyaryletherketone (PAEK). These materials may be admixed with additives to vary the material property. Additives of the type involved here have a positive influence on friction, wear and strength to optimize the thermoplastic material for use as material for the sliding element. In addition, thermoplastic material admixed with additives is easy to process and inexpensive. Another, currently preferred thermoplastic material for the sliding element involves PA 46 CF 30/PTFE 5/H. The combination of the thermoplastic material with carbon fibers as additive and polytetrafluoroethylene as solid lubricant is best suited to minimize friction and wear and thus to prolong the service life.

As a consequence of the low crack risk of the thermoplastics, these materials can easily be combined with the steel material of the adjustment ring or bearing ring. Suitably, the sliding element has a thickness in the range of 0.5 mm to 6 mm.

According to another feature of the present invention, the sliding ring may be connected to the adjustment ring or to the respective bearing ring. To ensure clarity, the following description uses the term "component" to refer to the part that is connected to the sliding element, i.e. either to the adjustment ring or the bearing ring. The sliding element may hereby be applied in the form of a coating directly upon the component, whereby the component has a support surface which may be formed with a groove in which the material for the sliding element is filled by way of an injection molding process. As a result, the sliding element and the component are effectively and permanently secured to one another. Stress as a result of shrinkage during the injection molding process can be controlled, when the groove in the support surface of the component is configured as an axis-parallel or helical notch. In this way, the sliding element and the component are effectively prevented from rotating relative to one another.

According to another feature of the present invention, the sliding element may also be applied onto the component through a force-fitting engagement, e.g. by gluing the sliding element upon the support surface of the component. An example of a suitable glue includes hot-melt adhesive. Gluing the sliding element to the component ensures also a compensation of irregularities, even small ones, between the support surface of the component and the sliding element, so that the presence of any voids, which may adversely affect the attachment and effectiveness of the parts that pivot relative to one another, can be eliminated.

According to another feature of the present invention, the sliding element may be configured to completely embrace the component, at least in predetermined sections, to thereby further enhance a secure attachment of the sealing ring to the component. Regardless of the configuration of the sliding ring, a form-fitting connection is established between the sliding element and the component. For a sliding element configured as coat, it is possible to provide the component as reinforcement which is embraced by the material of the sliding material in predetermined sections.

According to another feature of the present invention, the sliding element may be a separate member made of PA 46 CF 30/PTFE 5/H for disposition in the contact zone. Suitably, the sliding element is glued to the support surface of the component.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
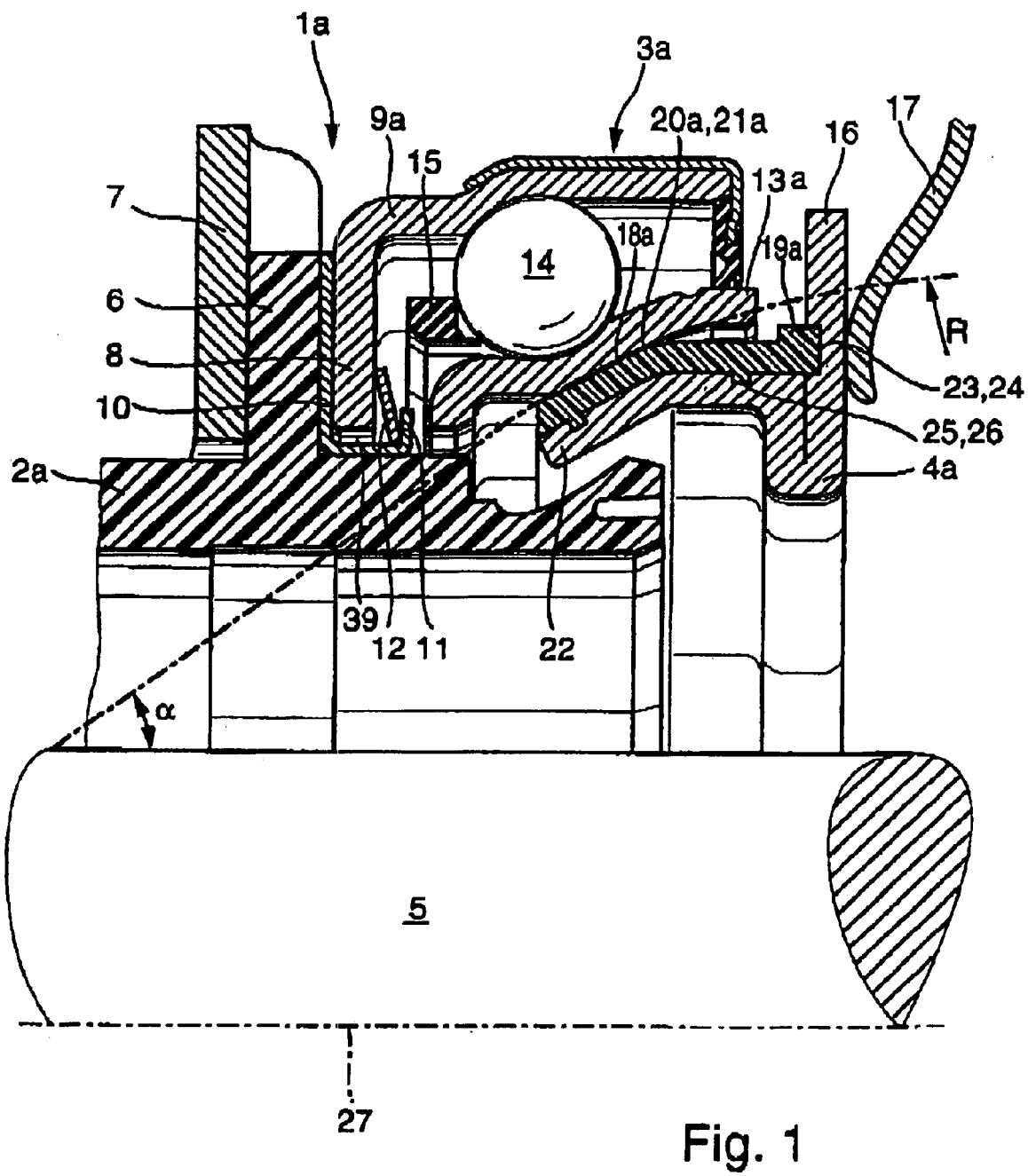
FIG. 1 is a half-section of a release mechanism having incorporated therein a release bearing according to the present invention, with a sliding element connected to an adjustment ring and supported on a revolving inner ring.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a half-section of a release mechanism, generally designated by reference numeral 1a and defined by a symmetry axis 27. The release mechanism 1a includes a casing 2a which is guided on a guide sleeve positioned in concentric surrounding relationship to a driveshaft 5 which connects an internal combustion engine to a gearbox. The casing 2a is formed with a radial shoulder 6 which is directed outwards and has one side intended for engagement of an actuating member 7 in the form of, e.g., a fork or rocker, whereby the actuating member 7 is connected to the clutch pedal in the footwell inside a motor vehicle via a cable or actuator. The other side of the shoulder 6 is intended for support of a release bearing, generally designated by reference numeral 3a. The release bearing 3a is configured in the form of a tapered roller bearing and includes a non-rotatable outer bearing ring 9a which is formed with an annular bottom or skirt 8 turned radially inwards and supported against the shoulder 6 of the casing 2a. Interposed between the skirt 8 and the shoulder 6 of the casing 2 is a sheet-metal holder or clip 10 which has a U-shaped configuration and embraces an end face of the skirt 8 and which has an inwardly turned flanged portion 11 on the end distal to the shoulder 6. A disk spring 12 urges the skirt 8 in forced engagement against the shoulder 6 and is disposed in a space between the flanged portion 11 of the clip 10 and the skirt 8 of the outer bearing ring 9a. A radial annular gap 39 is defined between the clip 10 and the skirt 8 to allow a self-adjustment of the release bearing 3a with respect to the casing 2a.

The release bearing 3a further includes a revolving inner bearing ring 13a, which is made of steel. A plurality of rolling members 14 is guided between confronting raceways of the outer bearing ring 9a and the inner ring 13a and held by a cage 15. Disposed at the side of the inner ring 13a, distal to the rolling members 14, is an adjustment ring 4a, which is made of steel, for support of the inner bearing ring 13a. The adjustment ring 4a has a ring flange 16. Forced against the inner ring distal side of the ring flange 16 is one end of a spring member 17, e.g., a disk spring, or spring finger ends thereof, which is connected to a clutch mechanism, such as a separating clutch, not shown in FIG. 1. Disposed in a contact zone 18a between the inner bearing ring 13a and the adjustment ring 4a is a sliding element 19a. In order to align or pivot the release bearing 3a in relation to the adjustment ring 4a, the directly supported components, i.e. the inner bearing ring 13a and the adjustment ring 4a, have complementary calotte-shaped sections 20a, 21a in the contact zone 18a. In the exemplified embodiment of FIG. 1, the sliding element 19a is secured to the adjustment ring 4a and extends from the ring flange 16 across the entire length of a leg portion 22 to also form hereby a calotte-shaped section, i.e. a convex section, which is urged in forced engagement with the confronting concave surface of the inner bearing ring 13a.

The sliding element 19a may be secured to the adjustment ring 4a in force-locking manner by gluing. As an alternative, the sliding element 19a may also be sprayed as a coat directly onto the leg portion 22 of the adjustment ring 4a. In order to prevent a rotation thereof, the sliding element 19a is formed with plural, circumferentially spaced axial lobes 23 which positively engage complementary recesses 24 of the ring flange 16. As an alternative, or in addition, the sliding element 19a may also be provided with pins 25 for engagement in corresponding anchoring grooves 26 of the leg portion 22 of the adjustment ring 4a.

As indicated in FIG. 1, the support zone 18a extends with respect to the symmetry axis 27 of the release mechanism 1a at an angle α. Reference character R denotes the radius of the support zone 18a, i.e., the sliding element 19a and the inner bearing ring 13a are radiused in the area of the contact zone 18.

The sliding element 19a is made of thermoplastic material, e.g. highly heat-resistant polyamides or polyaryletherketone (PAEK). These materials may be admixed with additives to vary the material property. Additives of the type involved here have a positive influence on friction, wear and strength to optimize the thermoplastic material for use as material for the sliding element 19a. Another, currently preferred, thermoplastic material for the sliding element 19a involves the use of PA 46 CF 30/PTFE 5/H (polyamide matrix with embedded carbon fibers in combination with polytetrafluoroethylene). The combination of the thermoplastic material with carbon fibers as additive and polytetrafluoroethylene as solid lubricant is best suited to minimize friction and wear and thus to prolong the service life.

Figure 2:
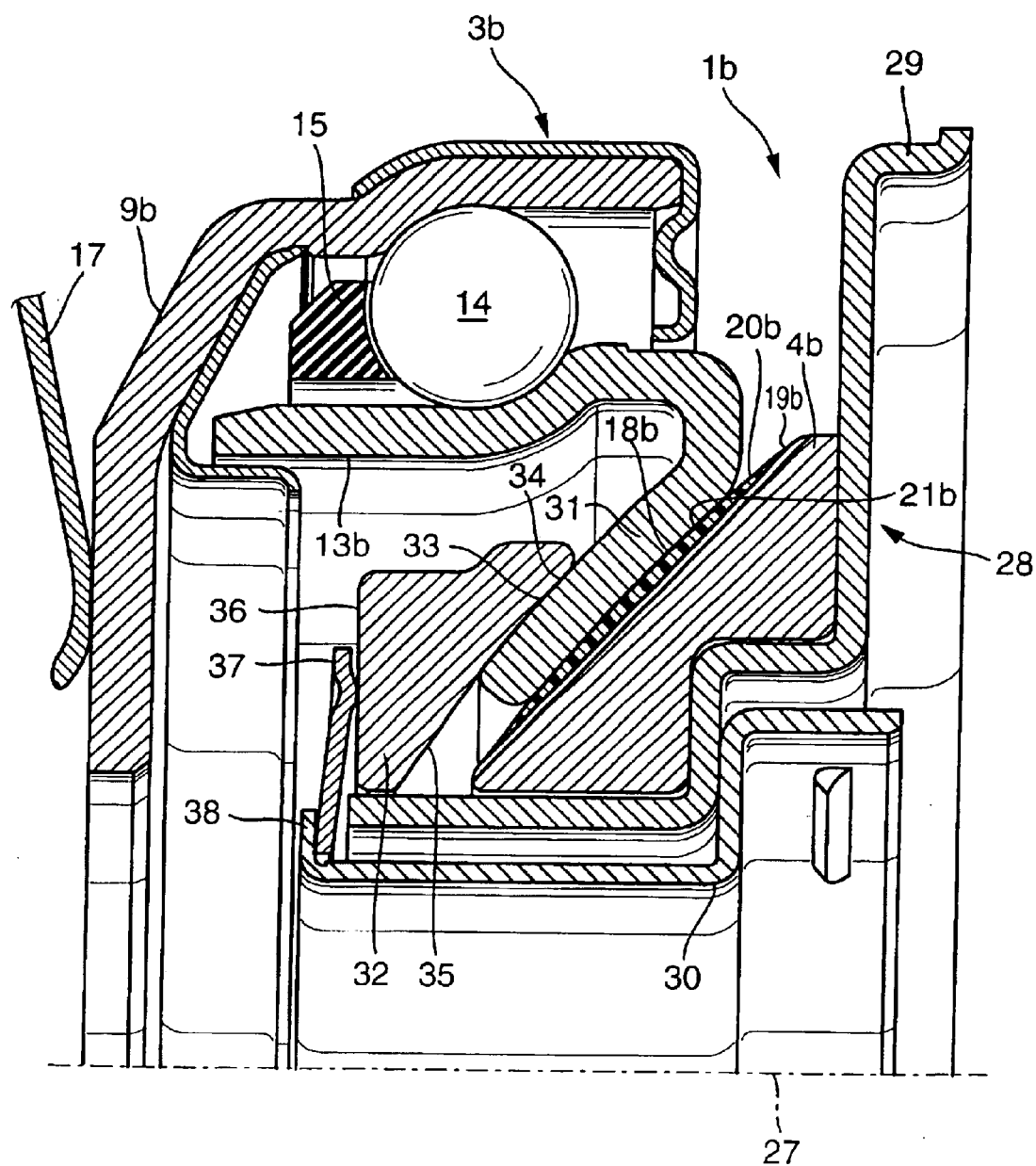
FIG. 2 is a half-section of a release mechanism having incorporated therein a release bearing according to the present invention, with a sliding element associated to the adjustment ring, with a non-rotating inner bearing ring swingably supported in relation to the adjustment ring.

Turning now to FIG. 2, there is shown a half-section of a release mechanism, generally designated by reference numeral 1b and having incorporated therein a release bearing according to the present invention, generally designated by reference numeral 3b. In the following description of the release bearing of FIG. 2, parts corresponding with those in FIG. 1 will be generally identified by corresponding reference numerals followed by the character "b". The release bearing 3b includes a revolving outer bearing ring 9b, a non-rotating inner bearing ring 13b, and a plurality of rolling members 14 which are guided between confronting raceways of the outer bearing ring 9b and the inner ring 13b and held by a cage 15. The release bearing 3b is arranged installed between the disk spring 17, connected to the separating clutch (not shown), and a pre-compression spring, which is not depicted here and interacts with the adjustment ring 4b. The adjustment ring 4b interacts with a holding element 28 having a flange 29 to support the pre-compression spring. The holding element 28 is positioned upon an axially movable clip 30 which is connected, when installed, with a piston that slides on the guide sleeve positioned in concentric surrounding relationship to the driveshaft 5 (FIG. 1) which connects an internal combustion engine to a gearbox.

The inner bearing ring 13b has a slantingly inwardly extending flange 31 for support upon a sliding element 19b which is associated to the adjustment ring 4b. At least in their contact zone 18b, the flange 31 of the inner bearing ring 13b and the adjustment ring 4b are provided with calotte-shaped sections 20b, 21b having a contour matching the contour of the sliding element 19b. As an alternative, the adjustment ring 4b may have a flat configuration, with the sliding element 19b having an outside forming a calotte-shaped section 20b.

The other side of the flange 31, distal to the contact zone 18b supports a thrust ring 32. Hereby, the thrust ring 32 and the flange 31 form in their contact zone 33 also calotte-shaped sections 34, 35. The thrust ring 32 has a sidewall 36 which extends perpendicular to the symmetry axis 27 of the release mechanism 1b and supports a disk spring 37 secured by an inwardly turned shoulder 38 of the clip 30.

The sliding element 19b is made of thermoplastic material and can be realized in a same manner as sliding element 19a, described above.

Figure 3:
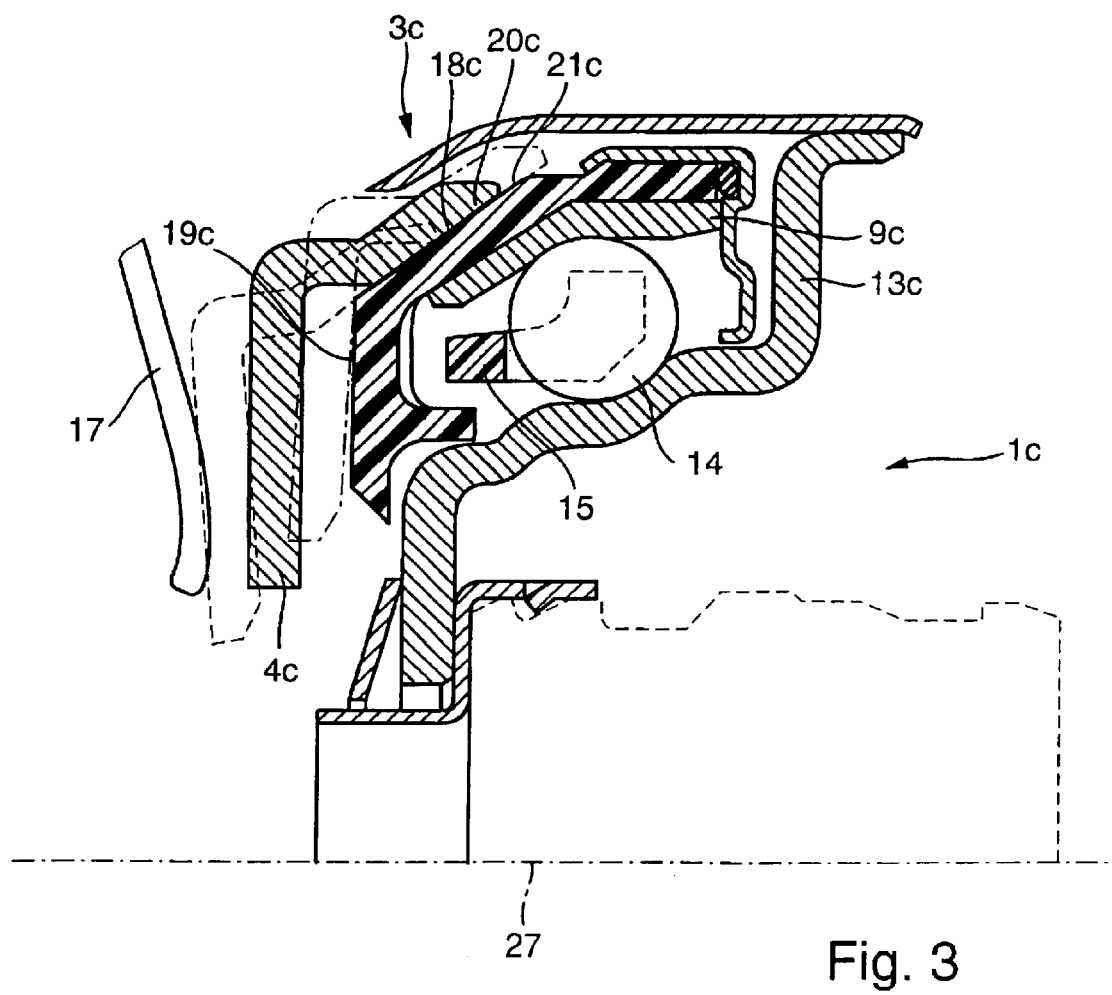
FIG. 3 is a half-section of a release bearing according to the present invention, with a sliding element enclosing an outer revolving bearing ring and swingably supporting an adjustment ring.

FIG. 3 shows a half-section of another variation of a release bearing according to the present invention, generally designated by reference numeral 3c, for use in a release mechanism 1c. In the following description of the release bearing of FIG. 2, parts corresponding with those in FIG. 1 will be generally identified by corresponding reference numerals followed by the character "c". The release bearing 3c includes a revolving outer bearing ring 9c, a non-rotating inner bearing ring 13c, and a plurality of rolling members 14 which are guided between confronting raceways of the outer bearing ring 9c and the inner ring 13c and held by a cage 15. The outer bearing ring 9c is surrounded on the outside by a sliding element 19c which supports the adjustment ring 4c. Also in this embodiment, the adjustment ring 4c and the sliding element 19c are provided with calotte-shaped sections 20c, 21c in a contact zone 18c. The adjustment ring 4c has a substantially disk-shaped configuration and is shown in FIG. 3 in an idle position, depicted by the hatching, and both extreme positions, indicated in broken line and representing the positions in which the adjustment ring 4c is pivoted in relation to the sliding element 19c. The disk spring 17 of the separating clutch is hereby supported on the adjustment ring 4c.

The sliding element 19c is made of thermoplastic material and can be realized in a same manner as sliding element 19a or 19b, described above.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A self-adjusting release bearing in the form of a tapered rolling bearing for a separating clutch disposed between an internal combustion engine and a gearbox of a motor vehicle, said clutch release bearing comprising:
   a non-rotating first bearing ring;
   a revolving second bearing ring;
   a plurality of rolling elements guided between the first and second bearing rings; and
   an adjustment ring having a cup-shaped section in a contact zone for support upon a complementary cup-shaped section of one of the first and second bearing rings to thereby allow pivoting of the release bearing; and
   a sliding element made of thermoplastic material and disposed in the contact zone.

2. The release bearing of claim 1, wherein the sliding element is made of PA 46 CF 30/PTFE 5/H.

3. The release bearing of claim 1, wherein the sliding element is made of polyamide.

4. The release bearing of claim 1, wherein the sliding element is made of polyaryletherketone (PAEK).

5. The release bearing of claim 1, wherein the thermoplastic material includes an additive.

6. The release bearing of claim 5, wherein the additive includes carbon fibers.

7. The release bearing of claim 1, wherein the sliding element has a thickness in the range of 0.5 mm to 6 mm.

8. The release bearing of claim 1, wherein the adjustment ring and the first bearing ring have the complementary cup-shaped sections in the contact zone.

9. The release bearing of claim 1, wherein the adjustment ring and the second bearing ring have the complementary cup-shaped sections in the contact zone.

10. The release bearing of claim 1, wherein a member selected from the group consisting of the first bearing ring, second bearing ring and adjustment ring, is provided with a coating made of PA 46 CF 30/PTFE 5/H for formation of the sliding element.

11. The release bearing of claim 10, wherein the sliding element is applied on the member by an injection molding process.

12. The release bearing of claim 10, wherein the member has a support surface formed with a groove for receiving the coating.

13. The release bearing of claim 12, wherein the groove is configured as an axis-parallel or helical notch.

14. The release bearing of claim 1, wherein the sliding element is configured to embrace a member selected from the group consisting of first bearing ring, second bearing ring and adjustment ring, at least in predetermined sections.

15. The release bearing of claim 1, wherein the sliding element is connected by a glue onto the adjustment ring or the one of the first and second bearing rings.

16. The release bearing of claim 15, wherein the glue is hot-melt adhesive.

17. The release bearing of claim 1, wherein the sliding element is a separate member made of PA 46 CF 30/PTFE 5/H for disposition in the contact zone.

18. A sliding element; comprising a body disposed in a clutch release bearing between an adjustment ring of steel and a bearing ring of steel, said body being made of thermoplastic material.

19. The sliding element of claim 18, wherein the body is made of a polyamide matrix combined with embedded carbon fibers in combination with polytetrafluoroethylene.

20. The sliding element of claim 18, wherein the body is made of polyaryletherketone.

* * * * *